Dec. 26, 1961 K. A. CEDERBLAD 3,014,509
TURNING TOOLS FOR WOOD TURNING
Filed Jan. 25, 1960

INVENTOR
KNUT AXEL CEDERBLAD

BY  Watson, Cole, Grindle & Watson

ATTORNEYS

United States Patent Office 3,014,509
Patented Dec. 26, 1961

3,014,509
TURNING TOOLS FOR WOOD TURNING
Knut Axel Cederblad, Umea, Sweden, assignor to Aktiebolaget Bahco, Stockholm, Sweden, a corporation of Sweden
Filed Jan. 25, 1960, Ser. No. 4,283
Claims priority, application Sweden Feb. 7, 1959
5 Claims. (Cl. 142—56)

The present invention relates to a turning tool for wood turning of the type, the bottom surface of which rests during the turning operation on the hand tool rest The turning tool of FIGURE 1 is formed with a flat of the lathe and the cutting edge of which is formed by the intersection of the top surface of the tool with a ground bevel extending from the bottom side.

Such turning tools have hitherto usually had a rounded cross-section with a longitudinal rounded recess in the top surface of tool. During the turning operation such a tool is held with its rounded bottom surface resting against the tool rest. These known turning tools, however, are difficult to use because on account of the rounded shape they are difficult to hold securely in the operating position and the slightest deviation from the intended position can adversely affect the result of the turning operation and can easily cause accidents.

The object of this invention is to provide a turning tool for wood truning, in which the disadvantages of the prior art turning tools are eliminated.

In accordance with this invention, a turning tool for wood turning is characterized by the feature that the bottom surface of the tool is flat and the top surface thereof is formed with a substantially central longitudinal ridge-like elevation such that when the tool is ground there are formed two cutting edges at opposite sides of the elevation, said edges being at an angle to the flat bottom surface of the tool.

This and other features characteristic of this invention will be explained in detail below with reference to the embodiments shown on the accompanying drawings.

Figure 1:
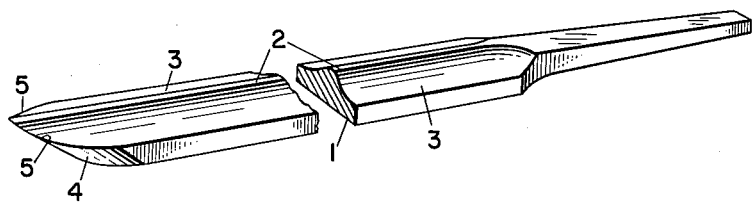
FIGURE 1 shows a first embodiment of a turning tool in accordance with this invention in perspective and partly in section.

bottom surface 1 while the top surface is formed with a central longitudinal ridge-like elevation 2 defined by concave lateral surfaces 3. The front end of the turning tool is ground so that it is of plow-like shape, the apex coinciding with the elevation 2. By an undercut ground bevel 4 of the front end of the tool, a cutting edge 5 will be formed on each side of the elevation, said edges at least along the major portion of their lengths being at an angle to the flat bottom surface 1 of the tool.

A turning tool of this configuration has the advantage that due to the flat bottom surface it is securely supported by the hand tool rest whereby accidents are avoided, and also the advantage that due to the above-described profiled top surface in conjunction with the ground bevel it obtains a considerably improved cutting action as compared to the turning tools hitherto employed.

Figure 2:
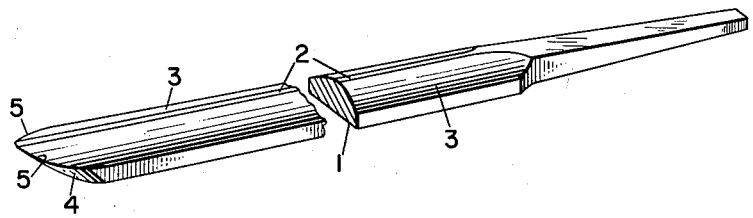
FIGURES 2 and 3 illustrate two additional embodiments in a similar manner.
Figure 3:
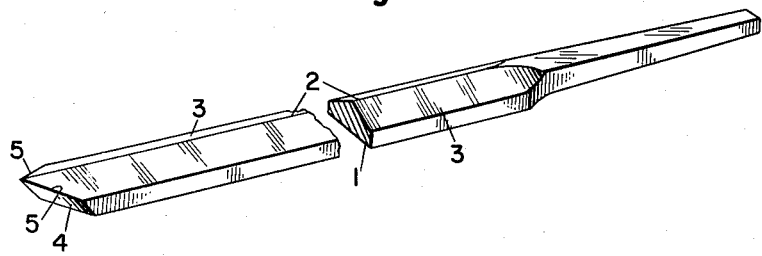

The embodiments of FIGURES 2 and 3 differ from that described above substantially only in that the surfaces 3 defining the ridge-like elevation 2 are convex and flat respectively.

The invention is not restricted to the embodiments shown and described, but these may be varied in many ways within the scope of the invention.

I claim:
1. A wood-turning tool adapted to be freely supported upon the tool rest of a wood-turning lathe and having an elongated body and a forward cutting portion adapted to be brought into operative contact with a rotating work piece; said tool characterized in that said body has a flat bottom surface adapted to bear levelly upon the tool rest, a substantially centrally located and longitudinally extending ridge-like elevation on the top surface of said body, bevelled forward end surfaces on said body, one upon each side of said ridge-like elevation, said bevelled surfaces each extending downwardly and rearwardly to form an obtuse angle with respect to said flat bottom surface and making an acute angle to the top surface of the body of the tool to form one cutting edge upon each side of said elevation, each of said cutting edges at least along the major portion of its length extending laterally outwardly along a line which if projected would intersect the plane of said bottom surface at an acute angle.

2. A turning tool as in claim 1 in which said ridge-like elevation is defined by concave lateral surfaces.

3. A turning tool as in claim 1 in which said ridge-like elevation is defined by convex lateral surfaces.

4. A turning tool as in claim 1 in which said ridge-like elevation is defined by inclined flat lateral surfaces.

5. A wood-turning tool adapted to be freely supported upon the tool rest of a wood-turning lathe and having an elongated body and a forward cutting portion adapted to be brought into operative contact with a rotating work piece; said tool characterized in that said body has a flat bottom surface adapted to bear levelly upon the tool rest, a substantially centrally located longitudinally extending ridge-like elevation on the top surface of said body, bevelled forward end surfaces on said body, one upon each side of said ridge-like elevation, said bevelled surfaces each extending downwardly and rearwardly to form an obtuse angle with respect to said flat bottom surface and making an acute angle to the top surface of the body of the tool to form one cutting edge upon each side of said elevation, each of said cutting edges at least along the major portion of its length extending laterally outwardly along a line which if projected would intersect the plane of said bottom surface at an acute angle, said cutting edges also sloping laterally and rearwardly from their junction at the point where they intersect the apex of said ridge-like elevation.

References Cited in the file of this patent
UNITED STATES PATENTS 2,465,305 Cope _____ Mar. 22, 1949
2,490,565 Williams _____ Dec. 6, 1949